US012694015B2

(12) United States Patent  
Kim

(10) Patent No.: US 12,694,015 B2  
(45) Date of Patent: Jul. 28, 2026

(54) METHOD AND APPARATUS FOR SUPPORTING MULTIPLE OUTSTANDING VECTOR REQUESTS IN VECTOR DATABASE

(71) Applicant: D.notitia.Inc., Seoul (KR)

(72) Inventor: Young Il Kim, Seoul (KR)

(73) Assignee: D.notitia.Inc., Seoul (KR)

( * ) Notice: Subject to any disclaimer, the term of this patent is extended or adjusted under 35 U.S.C. 154(b) by 0 days.

(21) Appl. No.: 18/985,500

(22) Filed: Dec. 18, 2024

(65) Prior Publication Data

US 2025/0363098 A1     Nov. 27, 2025

(30) Foreign Application Priority Data

May 24, 2024     (KR) ........................ 10-2024-0067451

(51) Int. Cl.
| | |
|---|---|
| *G06F 16/242* | (2019.01) |
| *G06F 16/22* | (2019.01) |
| *G06F 16/248* | (2019.01) |

(52) U.S. Cl.
CPC ...... *G06F 16/2425* (2019.01); *G06F 16/2237* (2019.01); *G06F 16/248* (2019.01)

(58) Field of Classification Search
CPC . G06F 16/2425; G06F 16/2237; G06F 16/248
USPC ............... 707/722, 736, 741, 749, 769, 797
See application file for complete search history.

(56) References Cited

U.S. PATENT DOCUMENTS

| | | | | |
|---|---|---|---|---|
| 2005/0108203 A1* | 5/2005 | Tang | ..................... | H04L 69/329 |
| | | | | 707/999.003 |
| 2014/0149357 A1* | 5/2014 | Gupta | ................. | G06F 16/2308 |
| | | | | 707/652 |
| 2021/0406321 A1* | 12/2021 | Li | ........................ | G06F 16/2237 |
| 2025/0278420 A1* | 9/2025 | Lala | .................... | G06F 16/3329 |

OTHER PUBLICATIONS

Yingfan Liu et al., Accelerating massive queries of approximate nearest neighbor search on high-dimensional data, Knowledge and Information Systems, vol. 65, pp. 4185-4212, Springer, 2023. (https://link.springer.com/content/pdf/10.1007/s10115-023-01899-2.pdf).
Hiroyuki Ootomo et al, CAGRA: Highly Parallel Graph Construction and Approximate Nearest Neighbor Search for GPUs (Aug. 29, 2023) (https://arxiv.org/pdf/2308.15136v1).
Korean Office Action for KR Application No. 10-2024-0067451, issued Oct. 16, 2025.

* cited by examiner

*Primary Examiner* — Phong H Nguyen
(74) *Attorney, Agent, or Firm* — USX IP LLC

(57)     ABSTRACT

A method of processing multiple outstanding vector requests in a vector search system includes transmitting, by an apparatus for executing a vector index host, one or more queries to an apparatus for executing a vector search upon receiving the one or more queries; creating, by the apparatus for executing a vector index host, a candidate node list for searching the queries, for each of the queries; confirming, by the apparatus for executing a vector index host, a multiple-search counting number, selecting one or more search target nodes from the candidate node list, and transmitting a search request with respect to neighbor nodes of the search target node to the apparatus for executing the vector search; and transmitting, by the apparatus for executing a vector search, a search result for the search request to the apparatus for executing a vector index host.

8 Claims, 11 Drawing Sheets

METHOD AND APPARATUS FOR SUPPORTING MULTIPLE OUTSTANDING VECTOR REQUESTS IN VECTOR DATABASE

CROSS-REFERENCE TO RELATED APPLICATION

This application claims priority to and the benefit of Korean Patent Application No. 10-2024-0067451, filed on May 24, 2024, the disclosure of which is incorporated herein by reference in its entirety.

BACKGROUND

1. Field of the Disclosure

The present disclosure relates to a method and apparatus for efficiently using hardware resources by supporting multiple outstanding vector requests in a vector database.

2. Discussion of Related Art

Recently, as the number of companies seeking to apply generative artificial intelligence to their internal systems has increased, technologies to support more effective use of a large language model (LLM) have been developed. Technology architecture, such as development frameworks of LangChain and LlamaIndex, in context learning, and a vector database (vector DB), which constitutes the LLM, are attracting attention. In particular, the vector DB stores unstructured data such as tables, graphs, images, videos, and voices, and supports searching for unlabeled content.

In the vector DB, a vector search is a task of finding vectors most similar to a given query vector among vectors stored in the database. To this end, a vector database system may convert data (text, images, etc.) to be searched for into fixed-length dense vectors using a pretrained model and index the converted vectors in the vector DB for efficient search. In this case, various approximate nearest neighbor search techniques may be used. Unlike the traditional key-value search, the vector search is based on semantic similarity, and therefore has the advantage of enabling flexible and meaningful search. Recently, vector search technologies, such as semantic search using LLM and integrated search of multi-modal data (text, images, audio, etc.), have been developing in various directions.

RELATED ART DOCUMENT

Patent Document

Korean Published Patent Application No. 2023-0077251 A (Jun. 1, 2023)

SUMMARY OF THE INVENTION

The present disclosure is directed to providing a method of efficiently utilizing hardware resources of a vector database system by reducing an idle time of a hardware engine processing a vector search.

The present disclosure is also directed to providing a method to increase utilization of hardware resources by removing dependency of vector search hardware on a vector database host.

The technical problems to be solved by the present disclosure are not limited to that described above, and technical problems that are not mentioned will be clearly understood by those skilled in the art to which the present disclosure pertains from the present specification and the accompanying drawings.

According to an embodiment of the present disclosure, a method of processing multiple outstanding vector requests may include: transmitting, by an apparatus for executing a vector index host, one or more queries to an apparatus for executing a vector search upon receiving the one or more queries; creating, by the apparatus for executing a vector index host, a candidate node list for searching the one or more queries, for each of the one or more queries; confirming, by the apparatus for executing a vector index host, a multiple-search counting number, selecting one or more search target nodes from the candidate node list, and transmitting a search request with respect to neighbor nodes of the one or more search target nodes to the apparatus for executing the vector search; and transmitting, by the apparatus for executing a vector search, a search result for the search request to the apparatus for executing a vector index host.

Technical solutions of the present disclosure are not limited to the above-described technical solutions, and other technical solutions that are not mentioned will be clearly understood by those skilled in the art to which the present disclosure pertains from the present specification and the accompanying drawings.

BRIEF DESCRIPTION OF DRAWINGS

The above and other objects, features and advantages of the present disclosure will become more apparent to those of ordinary skill in the art by describing exemplary embodiments thereof in detail with reference to the accompanying drawings.

DETAILED DESCRIPTION OF EXEMPLARY EMBODIMENTS

Figure 1:
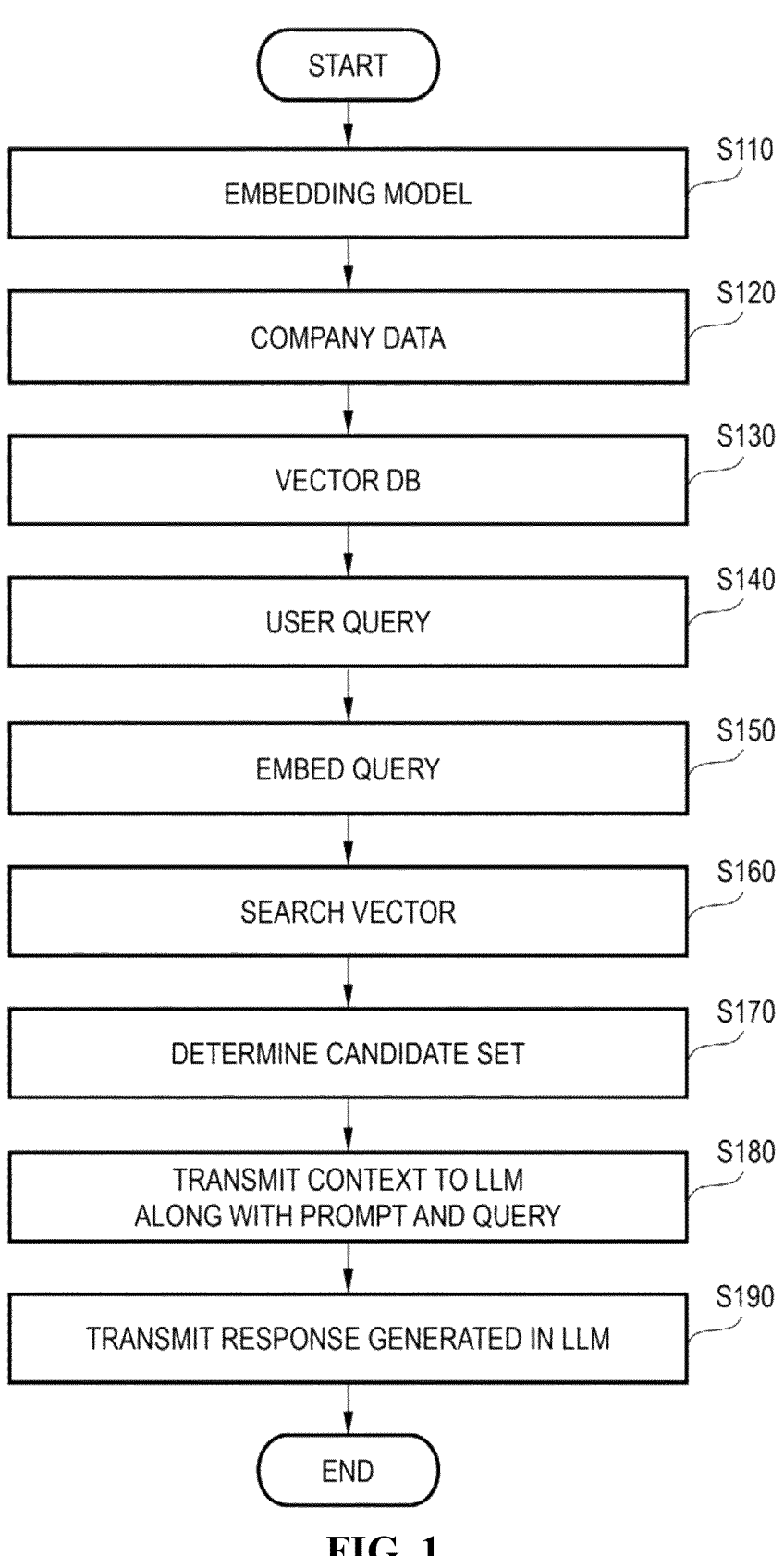
FIG. 1 is a flowchart for describing a method of requesting a large language model (LLM) to generate a response to a query by extracting a candidate set for the query from internal data of a company according to an embodiment of the present disclosure.

Hereinafter, exemplary embodiments of the present disclosure will be described with reference to the accompanying drawings.

However, embodiments of the present disclosure may be modified in many different forms and the scope of the disclosure should not be limited to the embodiments set forth herein. In addition, exemplary embodiments of the present disclosure are provided in order to describe the present disclosure more completely to those skilled in the art.

That is, the above-described objects, features, and advantages will be described below in detail with reference to the accompanying drawings, and accordingly, those skilled in the art to which the present disclosure pertains will be able to easily implement the technical idea of the present disclosure. When it is decided that the detailed description of known art related to the present disclosure may unnecessarily obscure the gist of the present disclosure, such detailed description will be omitted. Hereinafter, exemplary embodiments of the present disclosure will be described in detail with reference to the accompanying drawings. In the drawings, the same reference numerals are used to indicate the same or similar components.

In addition, singular forms used in the specification are intended to include plural forms unless the context clearly indicates otherwise. In the present application, the terms "comprising," "including," and the like are not to be construed as necessarily including several components or several steps described in the specification, and it is to be construed that some of the above components or steps may not be included or additional components or steps may be further included.

In addition, in order to describe a system according to the present disclosure, various components and sub-components thereof will be described below. These components and their sub-components may be implemented in various forms, such as hardware, software, or a combination thereof. For example, each element may be implemented as an electronic configuration for executing a corresponding function or may be implemented as software itself that can be run in an electronic system or as one functional element of such software. Alternatively, it may be implemented as an electronic configuration and driving software corresponding thereto.

Various techniques described in the present specification may be implemented with hardware or software, or a combination of both if appropriate. As used in the present specification, the terms "unit," "server," "system," and the like refer to a computer-related entity, that is, software, or hardware or a combination of hardware and software equivalent to software in execution. In addition, each function executed in the system of the present disclosure may be configured in module units and recorded in one physical memory or distributed between two or more memories and recording media.

Although various flowcharts are disclosed to describe the embodiments of the present disclosure, this is for convenience of description of each step, and each step is not necessarily performed according to the order of the flowchart. That is, the operations in the flowchart may be performed simultaneously, performed in an order according to the flowchart, or may be performed in an order opposite to the order in the flowchart.

FIG. 1 is a flowchart for describing a method of requesting a large language model (LLM) to generate a response to a query by extracting a candidate set for the query from internal data of a company according to an embodiment of the present disclosure.

In order to introduce generative artificial intelligence in a company, a service that constructs the internal data of the company into a database, searches a candidate set for the query, and transmits the query and candidate set to the LLM may be considered. In this service model, a company may query company data based on natural language and receive a generated answer for the query without having to provide the internal data of the company to the LLM.

According to an embodiment of the present disclosure for this purpose, in operation S110 of FIG. 1, the service server may prepare a vector embedding model. The vector embedding may express structured and unstructured data, such as text, images, voice, tables, and graphs, in a multidimensional vector space by reflecting data characteristics. In this way, semantic similarity of data may be measured. The vector embedding may be performed in various ways, and the present disclosure may not be interpreted as being limited thereto.

In operation S120, the service server may secure data of a service target company. The company data may include unstructured data such as PDFs, tables, graphs, charts, and videos. The service server may assign a tenant for a target company and apply the data to a vector embedding model to express the features of the company data as vector values.

In operation S130, the service server may structure the company data into a vector DB.

In this case, an index may be formed for effective search of a high-dimensional vector data set. The indexing may be performed in various ways, and the present disclosure may not be interpreted as being limited thereto.

The vector DB according to an embodiment of the present disclosure can be expressed as a graph that includes nodes representing feature values of data points of a company and edges representing correlations between multiple nodes. In this case, the graph may be formed in a hierarchical structure.

For example, in the graph, the vector of the data point is expressed as a graph node, and adjacent vectors may be connected as edges. Furthermore, a hierarchical structure can be formed by forming multiple layers, forming all nodes in the lowest layer, and forming fewer nodes in upper layers.

When a user query is received by the service server in operation S140, the service server may express the query as a vector value by applying the query to the vector embedding model in operation S160. This is to search the company data for data similar to the query.

Thereafter, in operation S160, the service server may perform a vector search task based on the similarity between a target company data vector and a query vector in the vector DB.

For example, as a vector search method, a method of comparing a query vector with all data points to calculate a distance between the query vector and the data points, and generating a candidate data set in order from the closest in distance may be considered. This method is very accurate but has a problem of slow speed.

Therefore, an approximate nearest neighbor search may be considered to provide some balance between a search speed and search quality. In the vector DB, the approximate nearest neighbor search algorithm is used to quickly find neighbor vectors close to a query vector in high-dimensional data. Since calculating the similarity to the query vector for all the data points has high accuracy but slow search speed, the nearest neighbor search algorithm may be a method of providing a compromise between accuracy and speed in vector search. The nearest neighbor search according to an embodiment of the present disclosure is described below with reference to the attached drawings.

Operation S160 may include a process of creating a candidate node list for a query vector in a vector index host, transmitting a search request from the vector index host to vector search hardware, performing a search task in the vector search hardware, and transmitting the search result to the vector index host.

The vector search hardware is a hardware device that accelerates vector and matrix operations, and is dedicated hardware or an offloading engine that is in charge of vector calculation in a vector database system.

Describing the operation of the vector search hardware in detail, the vector search hardware receives a search request from the vector index host to perform a search task, and after the search task is completed, has an idle time until the next search request is received and the search task is performed. This is because the vector index host receives the response from the vector search hardware, updates the candidate node list, and then transmits the next search request to the vector search hardware. That is, the operation of the vector search hardware in operation S160 is dependent on the vector index host, and idle time may occur in the performance of the search task.

To solve this problem, according to an embodiment of the present disclosure, multiple outstanding vector requests are supported in the vector DB, thereby reducing the dependency of the vector search hardware on the vector index host and increasing the hardware resource utilization of the vector database system.

More specifically, according to the present disclosure, when the vector index host transmits a search request for an arbitrary query to the vector search hardware, it is possible to transmit a request for another node in the candidate node list to the vector search hardware along with a request for a specific node in the candidate node list (i.e., without waiting for the response to the search result). Therefore, the vector search hardware may perform a search for the specific node, return the search result to the vector index host, and then immediately perform a search for another node without the idle time, so that it is possible to increase the hardware resource utilization.

According to another embodiment of the present disclosure, when the vector index host transmits a search request for an arbitrary query to the vector search hardware, a search request for another query may also be transmitted together (i.e., without waiting for the response). In this case, the vector search hardware may perform a search for a specific node of a specific query, return the search result to the vector index host, and then immediately perform a search for another node without the idle time, so that it is possible to increase the hardware resource utilization.

This will be described in detail below with reference to the attached drawings.

Subsequently, when a candidate data set is extracted based on the similarity to the query vector in operation S170, in operation 180, the service server can transmit the query, the candidate data set, and the context to the LLM along with a prompt for receiving an appropriate response. The LLM may generate a response required by a user based on the received data even if the data is not trained.

In operation S190, the service server may transmit the response received from the LLM to the user.

Figure 2:
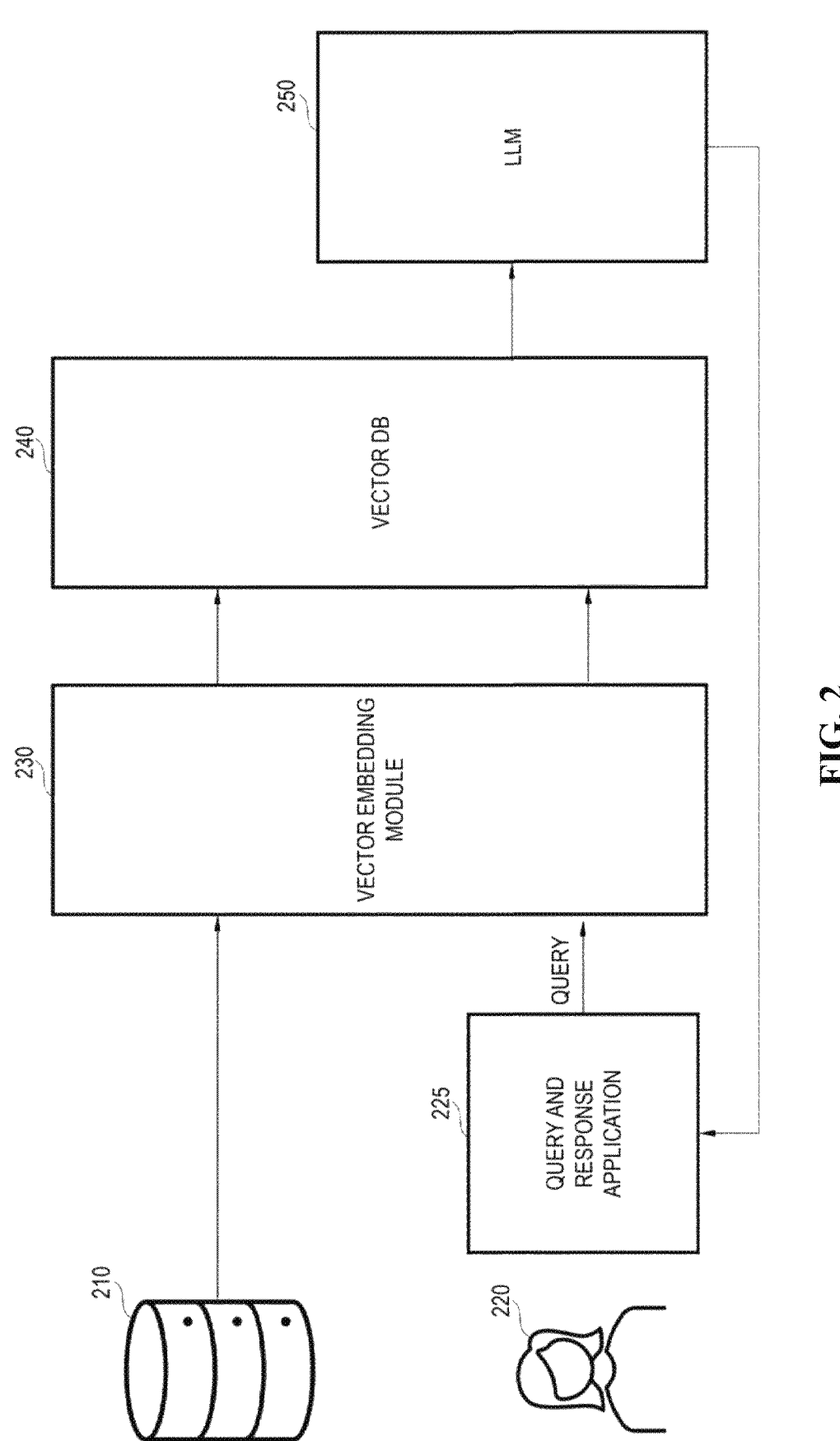
FIG. 2 is a diagram for describing a structure of a system for requesting an LLM to generate a response to a query by extracting a candidate set for the query from internal data of a company according to an embodiment of the present disclosure.

FIG. 2 is a flowchart for describing a structure of a system for requesting an LLM to generate a response to a query by extracting a candidate set for the query from internal data of a company according to an embodiment of the present disclosure.

Each block of FIG. 2 is intended to describe a structure of a system according to an embodiment of the present disclosure and may not be interpreted as being limited to an individual physical device and may include virtualized computing resources.

A block 210 of FIG. 2 is a storage that stores internal data of a company and may perform a function of storing structured and/or unstructured data.

A block 230 of FIG. 2 is a vector embedding module that performs vector embedding. The vector embedding may express structured and unstructured data, such as text, images, voice, tables, and graphs, in a multidimensional vector space by reflecting data characteristics. In this way, semantic similarity of data may be calculated. The vector embedding may be performed in various ways, and the present disclosure may not be interpreted as being limited thereto.

A block 240 of FIG. 2 is a vector DB that can be expressed as a graph including nodes representing feature values of data points of a company and edges representing correlations between multiple nodes. In this case, the graph may be formed in a hierarchical structure. When the vector embedding module 230 is applied, data of the block 210 may be embedded and an index may be formed in the vector DB 240 for effective search of a high-dimensional vector data set.

Meanwhile, a user 220 of FIG. 2 may input a natural language query through a question and response application 225 provided by the system according to an embodiment of the present disclosure. The user query may be expressed as a vector value when the vector embedding module 230 is applied. This is for searching for the candidate data set based on the similarity of the query vector at the vector DB 240. In particular, the vector database system according to an embodiment of the present disclosure supports the multiple outstanding vector requests, thereby increasing the hardware resource efficiency.

When the candidate data set is extracted based on the similarity to the query vector at the vector DB 240 of FIG. 2, an LLM 250 may receive the query, the candidate data set, and the context along with the prompt. Then, when the LLM 250 returns a response to the question and response application 225, the user 220 may confirm the response to the query.

Figure 3:
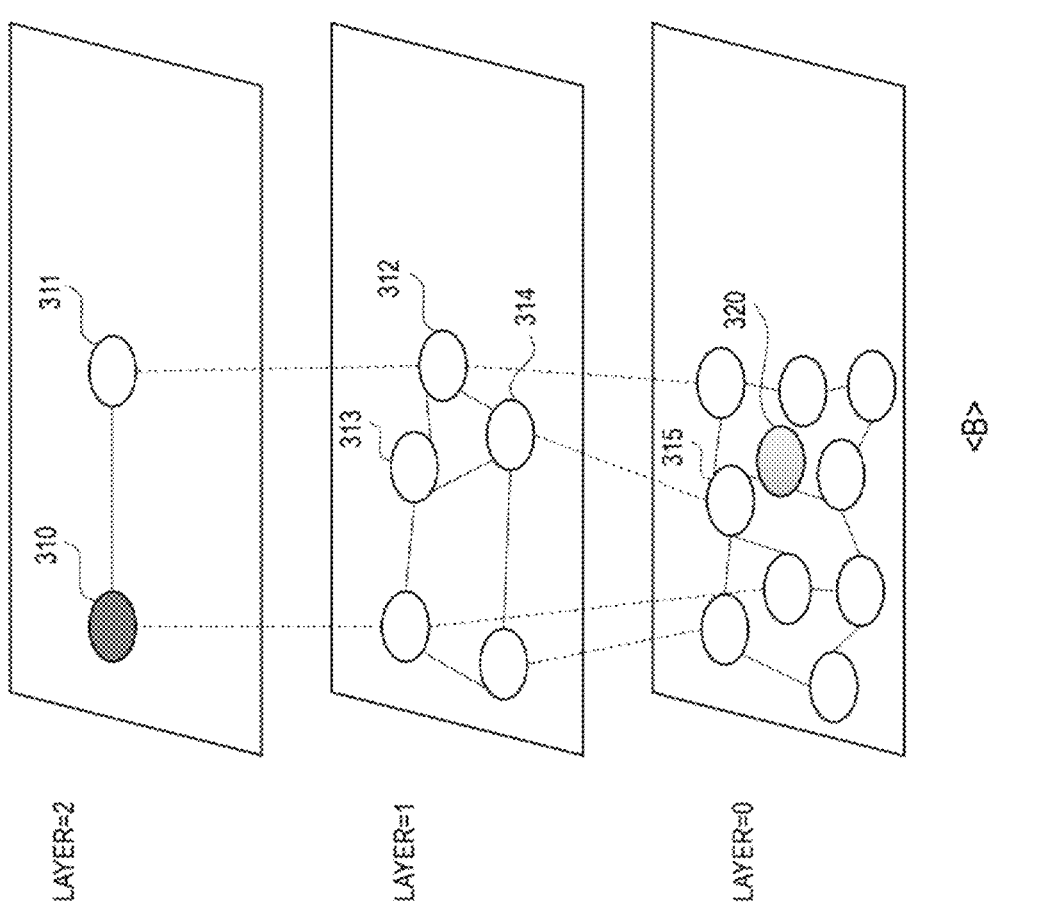
FIG. 3 is a diagram for describing a vector data index structure according to an embodiment of the present disclosure and a query search method.
Figure 3:
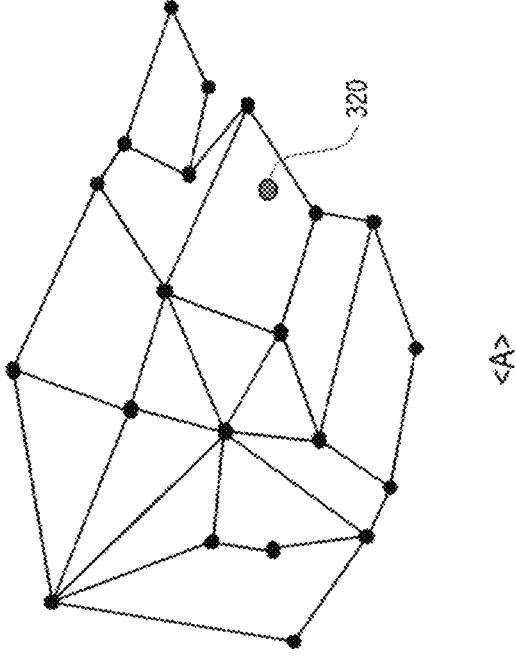

FIG. 3 is a diagram for describing a vector data index structure according to an embodiment of the present disclosure and a query search method.

As illustrated in FIG. 3, a vector data index structure according to an embodiment of the present disclosure may be expressed as a graph including nodes representing feature values of data points and edges representing correlations between multiple nodes. In this case, the graph may be formed as a planar structure as illustrated in <A> of FIG. 3 but may also be formed as a hierarchical structure as illustrated in <B> of FIG. 3.

When the vector data index according to an embodiment of the present disclosure is formed as the hierarchical structure, as illustrated in layer 0 of <B> of FIG. 3, the lowest layer may include all nodes for data points and may be configured by connecting only similar nodes with horizontal edges. Furthermore, as illustrated in layer 1 of <B> of FIG. 3, some nodes may be extracted probabilistically from a lower layer, and similar nodes among the extracted nodes may be connected with horizontal edges to form an upper layer. The vector data index structure according to an embodiment of the present disclosure may extract fewer nodes in higher layers, and when there is a similar correlation between the nodes included in a lower layer and the nodes included in a higher layer, these nodes may be connected with vertical edges to form a hierarchical structure.

Meanwhile, when a query node 320 is input in the example of FIG. 3, according to an embodiment of the present disclosure, nodes similar to the query node 320 may be quickly searched for using the index of FIG. 3. More specifically, by starting a search from a start node, a distance from neighbor nodes of the start node may be calculated to move a node to the closest node, and a distance from neighbor nodes may be calculated even at the corresponding node to repeat movement of a node, so that the closest node may be quickly searched for.

In this case, when the index has a hierarchical structure as illustrated in <B> of FIG. 3, the search starts from a start node 310 of a top layer and moves to a node 311, which is close to the query node 320. At node 311, when it may not get any closer to query node 320, it may move to a node 312 of the lower layer, which is connected to node 311. In other words, at the node 311, it moves to nodes 312 and 314 close to the query node 320. At the node 314, when it may not get any closer to query node 320, it may move to a node 315 of the lower layer, which is connected to node 314. By repeating this process until it gets closest to the query node 320, it is possible to quickly find a node 315 that is closest to the query node 320.

This search method may be called an approximate nearest neighbor (ANN) index search, which has the effect of efficiently searching for approximate nearest data in high-dimensional data. The ANN index search mainly uses a search algorithm based on cosine similarity or Euclidean distance, so that the vector similarity may be calculated.

Figure 4:
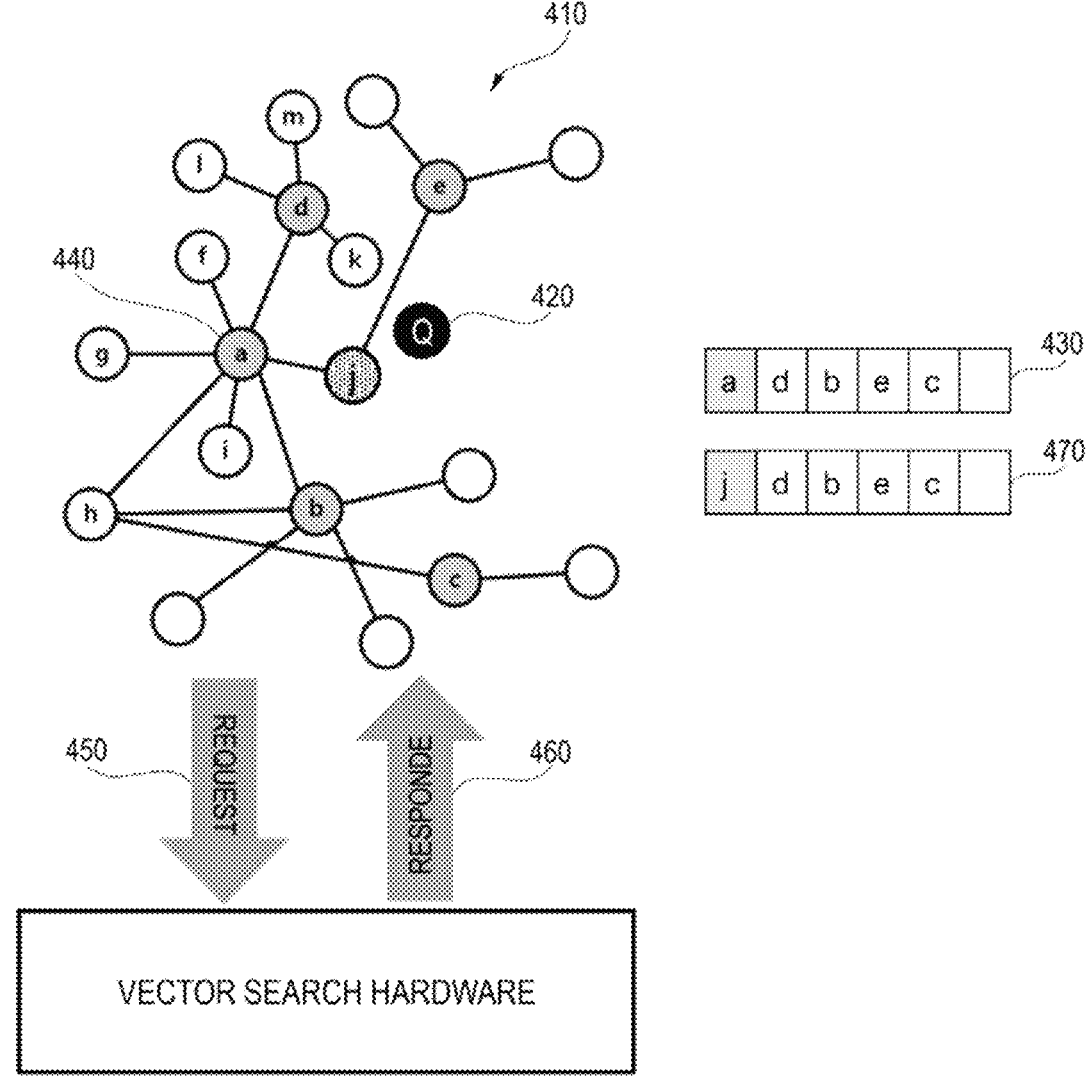
FIG. 4 is a diagram for describing dependency of a vector search processing engine on a vector index host in a vector database system.

FIG. 4 is a diagram for describing dependency of a vector search processing engine on a vector index host in a vector database system. In the database system, the vector index host is a software system component running on a central processing unit (CPU) that processes an operation of an ANN algorithm, and the vector search hardware is a hardware device that accelerates vector and matrix operations and may be called dedicated hardware or an offloading engine that is in charge of vector calculation in the vector database system.

A vector index structure such as 410 may be considered. When a query such as 420 is input to a vector index structure such as 410, the vector index host may create a candidate node list as nodes a, d, b, e, c for a query vector as in 430. The candidate node list 430 may be a list of nodes for calculating the similarity between the query vector and the neighboring node, and the size and update conditions of the candidate node list may be set in advance.

For example, when the candidate node list is a, d, b, e, and c as in 430, the vector index host may request the vector search hardware to search for the query 420 for f, g, h, i, and j, which are neighbor nodes of node a with the highest priority as in 450. In this case, the vector search hardware may receive the request to start the vector search and return the vector search result to the vector index host as in 460. Thereafter, the vector index host may update the candidate node list by referring to the response from the vector search hardware. For example, when the vector search result is 8 for node f, 12 for node g, 15 for node h, 7 for node i, and 2 for node j, the vector index host will update the candidate node list as in 470 by recording the node j with the shortest distance to the query 420 at the very front of the candidate node list.

Thereafter, the vector index host may request the vector search hardware to search for the query 420 for e, which is a neighbor node of node j with the highest priority in the updated candidate node list. In this case, the vector search hardware may start the vector search only after receiving the request. That is, after returning a response 460 to the request 450, the vector search hardware has an idle time for a while until the next vector search is performed. This is because the vector index host receives the response from the vector search hardware, updates the candidate node list, and then transmits the next search request to the vector search hardware. In FIG. 4, the operation of the vector search hardware is dependent on the vector index host and causes the idle time in the performance of the search task.

To solve this problem, according to an embodiment of the present disclosure, multiple outstanding vector requests are supported in the vector DB, thereby reducing the dependency of the vector search hardware on the vector index host and increasing the hardware resource utilization of the vector database system.

Figure 5:
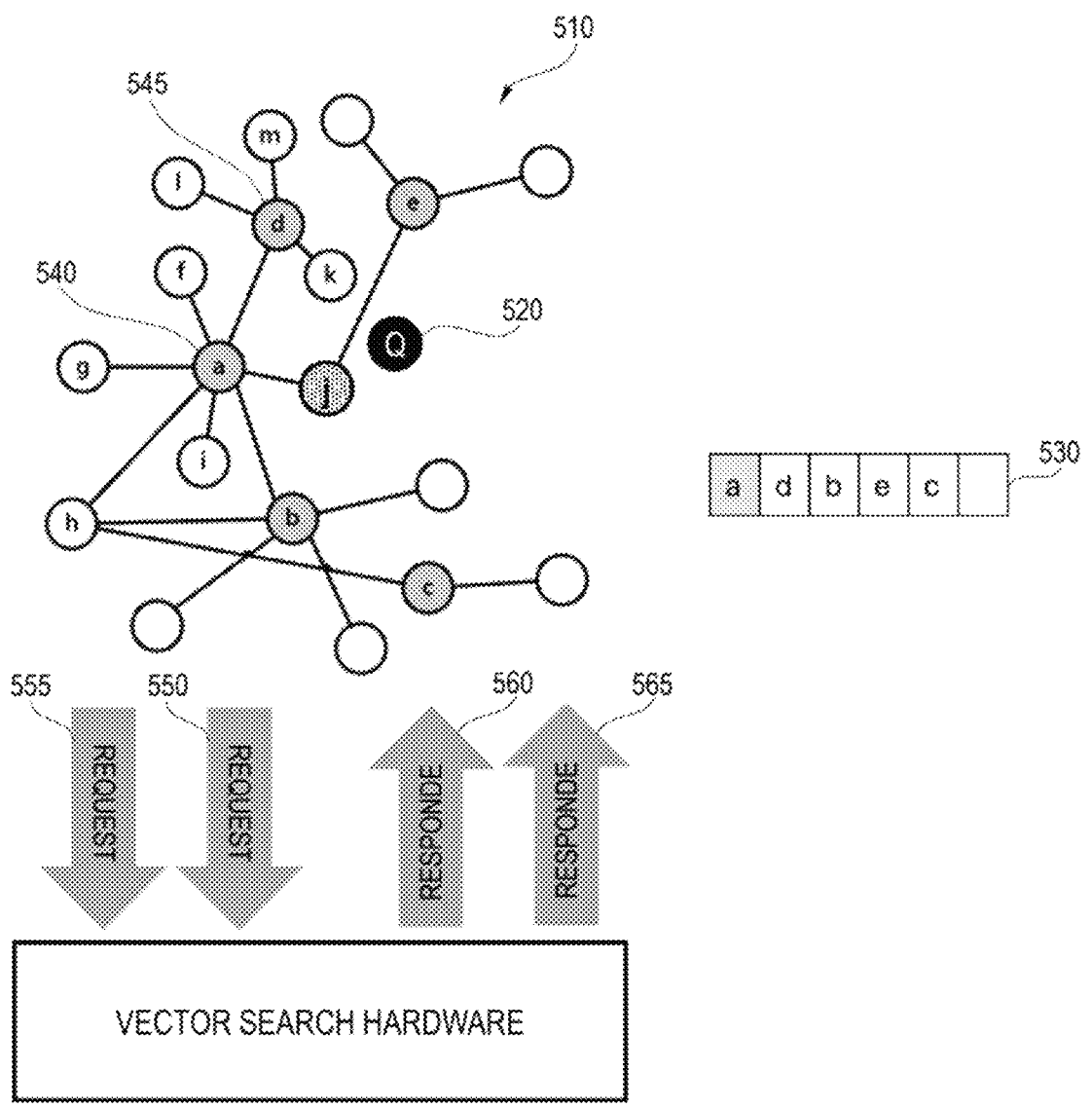
FIG. 5 is a diagram for describing a method of requesting multiple vector search in a vector database system according to an embodiment of the present disclosure.

FIG. 5 is a diagram for describing a method of requesting multiple vector search in a vector database system according to an embodiment of the present disclosure.

According to the present disclosure, when the vector index host transmits a search request for an arbitrary query to the vector search hardware, it is possible to transmit a request for another node in the candidate node list to the vector search hardware along with a request for a specific node in the candidate node list (i.e., without waiting for the response to the search result). Therefore, the vector search hardware may perform a search for the specific node, return the search result to the vector index host, and then immediately perform a search for another node without the idle time, so that it is possible to increase the hardware resource utilization.

For example, in a vector data index structure such as 510, when a query such as 520 is input, the vector index host may create a candidate node list such as 530 for the query vector.

For example, when the candidate node list is a, d, b, e, and c as in 530, the vector index host may request the vector search hardware to search for the query 520 for f, g, h, i, and j, which are neighbor nodes of node a 540 with a first priority in the candidate node list as in 550. Furthermore, the vector index host requests the vector search hardware to search for query 520 for l, m, and k, which are neighbor nodes of node d 545, which is a second priority in the candidate node list, as in 555, without waiting for a response to the request 550.

In this case, the algorithm by which the vector index host requests multiple searches to the vector search hardware is exemplified as the search priority of the candidate node list in the above description, but the present disclosure is not limited thereto. For example, the vector index host may perform a scheduling process of buffering a certain number of search requests before transmitting a plurality of search requests to a vector calculator, collecting search tasks with high search target vector similarity, and then batching and requesting a search task with high vector similarity. More specifically, the vector index host may batch and request search tasks with high Euclidean distance or cosine similarity of candidate nodes. This is because the more the neighbor nodes of the candidate nodes overlap, the higher the temporal proximity of the data points that the vector search hardware accesses in the vector search process, thereby increasing a cache hit rate.

In other words, it may be implemented by being modified into various algorithms that can increase the efficiency of the vector search. Furthermore, in the example of FIG. 5, two search requests were exemplified as multiple search requests, but the present disclosure is not limited thereto. The maximum value of multiple search requests may be based on the multiple-search counting number supported by the vector database system.

The vector search hardware that receives multiple search requests for the query 520 may schedule multiple vector search tasks and transmit responses to the vector search tasks to the vector index host sequentially or in parallel, as in 560 and 565.

In this way, when the vector database system supports multiple outstanding vector requests, it is possible to increase the resource utilization of the vector search hardware. In the example of FIG. 4, the vector index host receives the response from the vector search hardware, updates the candidate node list, and then transmits the next search request to the vector search hardware, and therefore the idle time occurs in the search task execution of the vector search hardware. However, in the example of FIG. 5, since the vector index host does not wait for the response from the vector search hardware and transmits multiple search requests, the vector search hardware only needs to schedule the search task, and there is no need for the idle time. Therefore, the idle time of the vector search hardware and the dependency of the vector search hardware on the vector index host are removed, so that it is possible to increase the efficiency of the vector database system and the utilization of the hardware resources.

Figure 6:
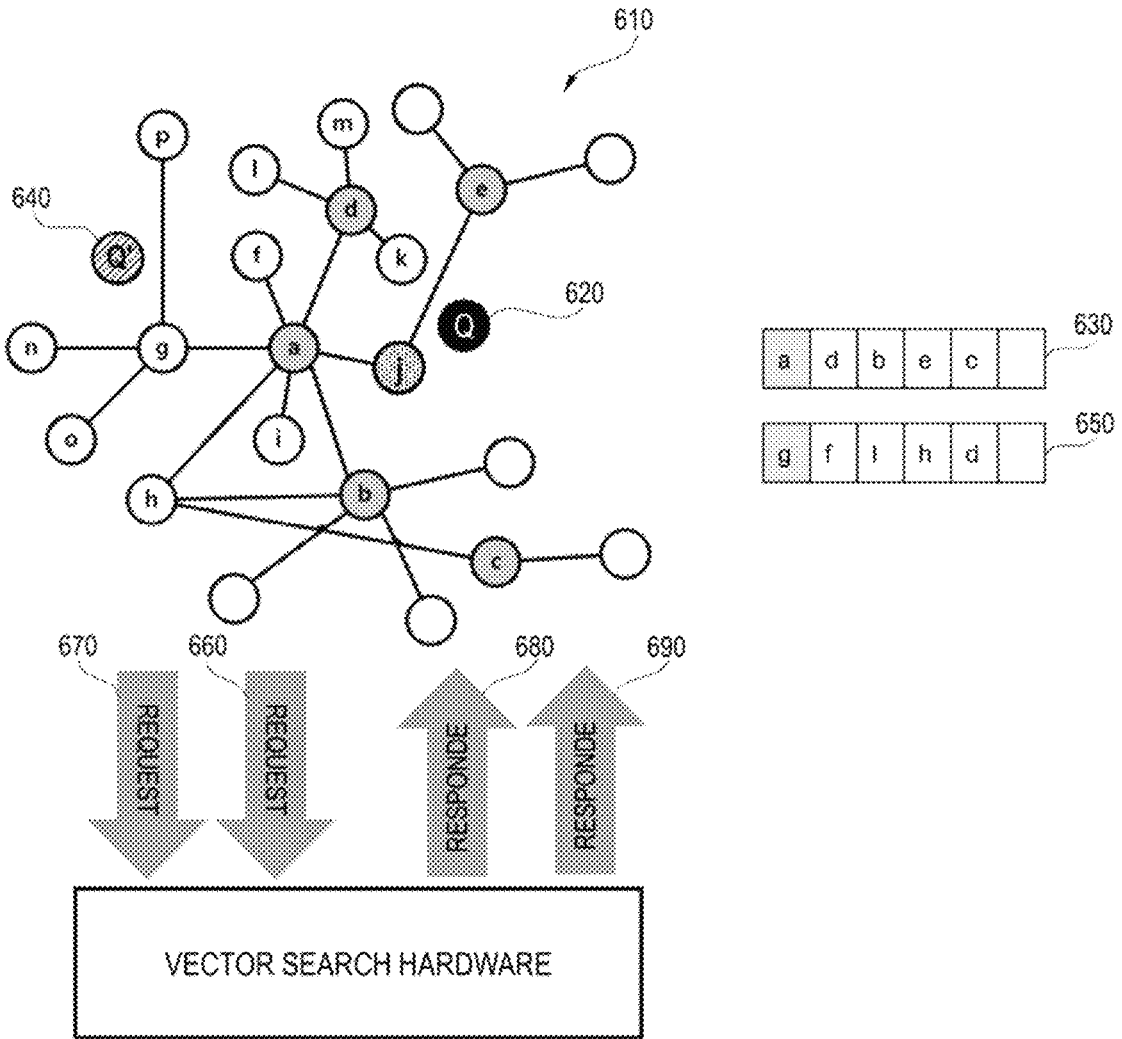
FIG. 6 is a diagram for describing a method of requesting a vector search for multiple queries in a vector database system according to an embodiment of the present disclosure.

FIG. 6 is a diagram for describing a method of requesting a vector search for multiple queries in a vector database system according to an embodiment of the present disclosure.

According to another embodiment of the present disclosure, when the vector index host transmits a search request for an arbitrary query to the vector search hardware, a search request for another query may also be transmitted together (i.e., without waiting for the response). In this case, the vector search hardware may perform a search for a specific node of a specific query, return the search result to the vector index host, and then immediately perform a search for another node without the idle time, so that it is possible to increase the hardware resource utilization.

For example, in a vector data index structure such as 610, when a query such as 620 is input, the vector index host may create a candidate node list such as 630 for the query vector.

For example, when the candidate node list is a, d, b, e, and c as in 630, the vector index host may request the vector search hardware to search for a query 620 for f, g, h, i, and j, which are neighbor nodes of node a 540 with a first priority in the candidate node list as in 660.

Furthermore, the vector index host may request the vector search hardware to search for another query 640, as in 670, without waiting for a response to the request 660. More specifically, the vector index host may create a candidate node list, such as 650, for the query vector when the query, such as 640, is received. For example, when the candidate node list is g, f, l, f, and d as in 650, the vector index host may request the vector search hardware to search for the query 640 for p, n, and o, which are neighbor nodes of node g with a first priority in the candidate node list as in 670.

According to an embodiment of the present disclosure, the algorithm by which the vector index host requests multiple searches to the vector search hardware can be modified in various ways to increase the efficiency of the vector search. Furthermore, in the example of FIG. 6, the number of queries, which is multiple search targets, is exemplified as two, but the present disclosure is not limited thereto. The maximum value of multiple search requests may be based on the multiple-search counting number supported by the vector database system.

For example, the vector index host may perform a scheduling process of buffering a certain number of search requests before transmitting a plurality of search requests to a vector calculator, collecting a search task with a high search target vector similarity, and then batching and requesting a search task with high vector similarity. More specifically, the vector index host may batch and request search tasks with high Euclidean distance or cosine similarity of query vectors. This is because the more the neighbor nodes of the candidate nodes overlap, the higher the temporal proximity of the data points that the vector search hardware accesses in the vector search process, thereby increasing a cache hit rate.

The vector search hardware, which receives the search requests for both the query 620 and the query 640, may schedule multiple vector search tasks and transmit the responses to the received requests to the vector index host sequentially or in parallel, as in 680 and 690.

In this way, when the vector database system supports multiple outstanding vector requests, it is possible to increase the resource utilization of the vector search hardware. In the example of FIG. 4, the vector index host receives the response from the vector search hardware, updates the candidate node list, and then transmits the next search request to the vector search hardware, and therefore the idle time occurs in the search task execution of the vector search hardware. However, in the example of FIG. 6, as in FIG. 5, the vector index host does not wait for the response from the vector search hardware, but transmits multiple search requests, so that the vector search hardware only needs to schedule the search task and the idle time is removed. Therefore, the idle time of the vector search hardware and the dependency of the vector search hardware on the vector index host are removed, so that it is possible to increase the efficiency of the vector database system and the utilization of the hardware resources.

Figure 7:
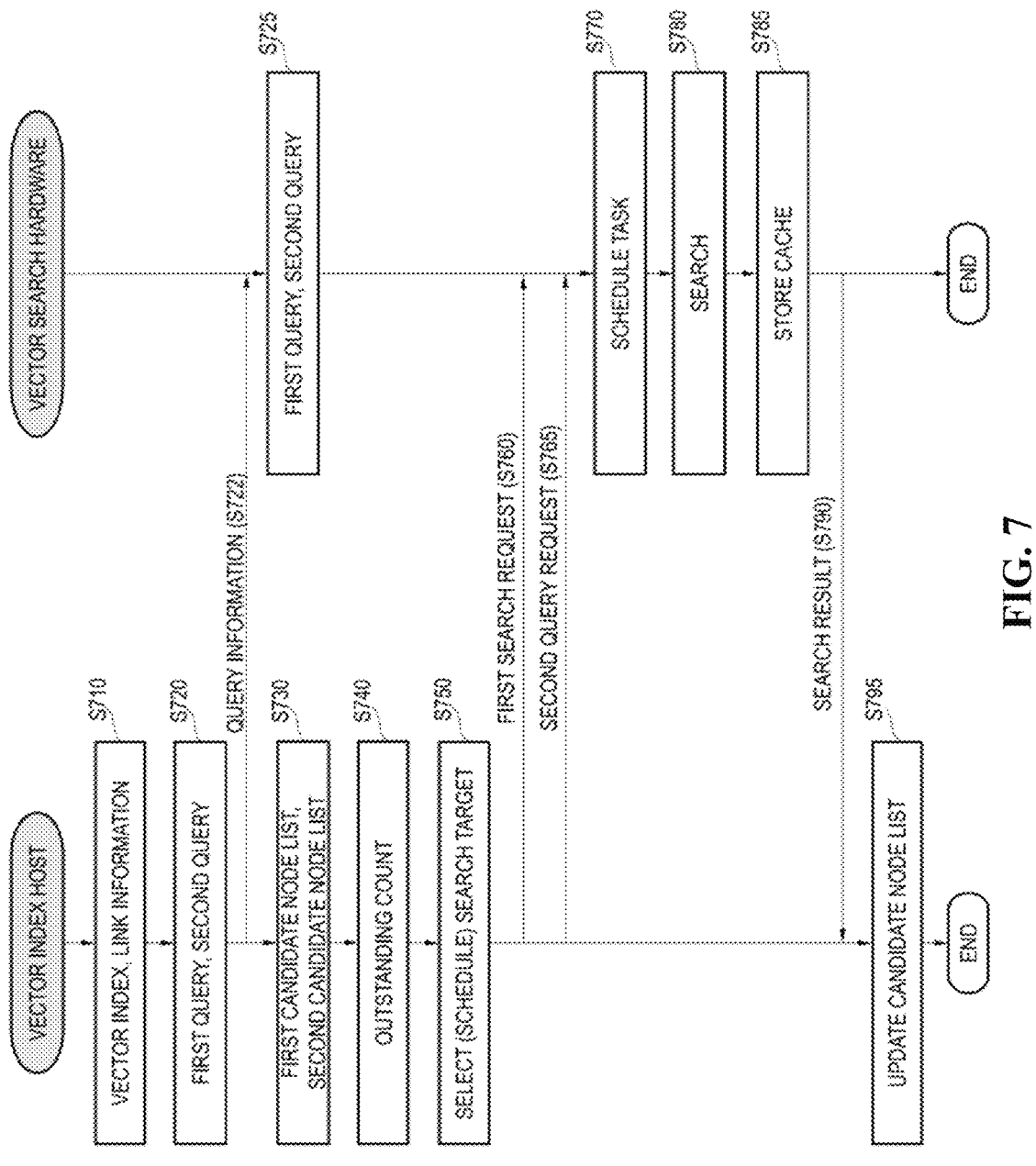
FIG. 7 is a flowchart for describing a method of processing multiple outstanding vector requests in a vector database system according to an embodiment of the present disclosure.

FIG. 7 is a flowchart for describing a method of processing multiple outstanding requests vector in a vector database system according to an embodiment of the present disclosure.

In operation S710, the vector index host may form an index for effective searching of a high-dimensional vector dataset. The indexing may be performed in various ways, and the present disclosure may not be interpreted as being limited thereto. For example, the vector index host may express the vector index as a graph including nodes representing feature values of data points and edges representing correlations between multiple nodes. Optionally, the graph may be formed in a hierarchical structure.

In operation S720, when a first query and a second query are input, the vector index host may transmit the query information to the vector search hardware (operation S722), and the vector search hardware may store at least one piece of query information in order to process different approximate nearest neighbor search tasks, i.e., search tasks for multiple queries (operation 725).

In operation S730, the vector index host may create a first candidate node list for the first query and a second candidate node list for the second query. A candidate node list may be a list of nodes for calculating the similarity between the query vector and the neighboring node, and the size and update conditions of the candidate node list may be set in advance. In operation S730, the vector index host according to an embodiment of the present disclosure may create a candidate node list for each of one or more queries.

In operation 740, the vector index host may confirm an outstanding count. The outstanding count is the total number of search tasks being processed or waiting in the vector search hardware at that time. The vector index host may confirm the system load and spare resources by confirming the outstanding count of the vector search hardware. In this way, the vector index host can identify the number of requests that may be additionally processed by the vector search hardware at that time.

In operation S750, the vector index host may select a target to search for an arbitrary query in the vector search hardware.

For example, the vector index host may select the neighbor nodes of the first node in the first candidate node list of the first query as the search targets for the first query. Furthermore, the vector index host may select the neighbor nodes of the second node in the first candidate node list as the search targets for the first query. Thereafter, the vector index host may transmit the search requests to the vector search hardware sequentially or in parallel by referring to the number of requests that may be additionally processed by the vector search hardware determined in operation S740 (operations S760 and S765).

As another example, the vector index host may select neighbor nodes of an arbitrary node in the first candidate node list of the first query as the search targets for the first query. Furthermore, the vector index host may select neighbor nodes of an arbitrary node in the second candidate node list of the second query as the search targets for the second query. Thereafter, the vector index host may transmit the search requests to the vector search hardware sequentially or in parallel by referring to the number of requests that may be additionally processed by the vector search hardware determined in operation S740 (operations S760 and S765).

As another example, the vector index host may select the neighbor nodes of the first node in the first candidate node list of the first query as the search targets for the first query. Furthermore, the vector index host may select the neighbor nodes of the second node in the first candidate node list of the first query as the search targets for the first query. The vector index host may select neighbor nodes of a third node in the second candidate node list of the second query as the search targets for the second query. Furthermore, the vector index host may select neighbor nodes of a fourth node in the second candidate node list of the second query as the search targets for the second query. Thereafter, the vector index host may transmit the search requests to the vector search hardware sequentially or in parallel by referring to the number of requests that may be additionally processed by the vector search hardware determined in operation S740 (operations S760 and S765).

According to an embodiment of the present disclosure, in operations S750 to S765, the vector index host may perform a scheduling process of buffering a certain number of search requests before transmitting a plurality of search requests to a vector calculator, collecting a search task with a high search target vector similarity, and then batching and requesting a search task with high vector similarity.

More specifically, the vector index host may batch and request search tasks with high Euclidean distance or cosine similarity of candidate nodes, or batch and request search tasks with high Euclidean distance or cosine similarity of query vectors. This is because the more the neighbor nodes of the candidate nodes overlap, the higher the temporal proximity of the data points that the vector search hardware accesses in the vector search process, thereby increasing a cache hit rate.

The vector search hardware that receives the search request may schedule a plurality of vector search tasks in operation S770, and store the search result in the memory cache in operation S785 while performing the plurality of search tasks sequentially or in parallel in operation S780.

For example, when the vector search hardware receives a first request to perform a search for neighbor nodes of the first node for the first query and a second request to perform a search for neighbor nodes of the second node for the first query, the vector search hardware may schedule a first search task according to the first request and a second search task according to the second request, and store each search result in the memory cache while performing the first search task and the second search task sequentially or in parallel.

As another example, when the vector search hardware receives a first request to perform a search for neighbor nodes of an arbitrary node for the first query and a second request to perform a search for neighbor nodes of an arbitrary node for the second query, the vector search hardware may schedule the first search task according to the first request and the second search task according to the second request, and store each search result in the memory cache while performing the first search task and the second search task sequentially or in parallel.

When each search task is completed, the vector search hardware may transmit search results for multiple search tasks to the vector index host sequentially or in parallel in operation S790.

In operation S795, the vector index host may update the candidate node list of the corresponding query by referring to the search results.

Figure 8:
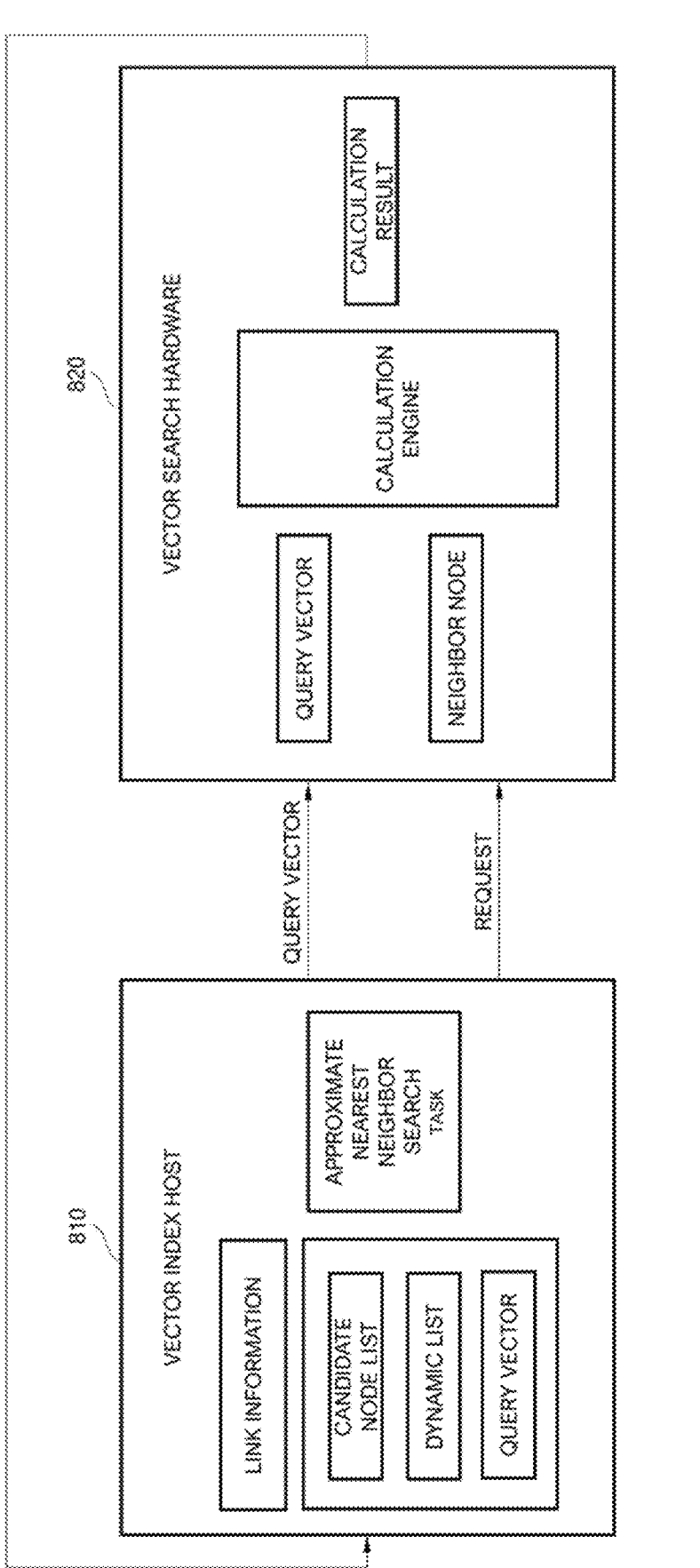
FIG. 8 is a diagram for describing a structure of a vector database system in which dependency of a vector search processing engine on a vector index host occurs.

FIG. 8 is a diagram for describing a structure of a vector database system in which dependency of a vector search processing engine on a vector index host occurs.

In the vector database system of FIG. 8, the vector index host 810 is a software system component running on the CPU that processes the operation of the ANN algorithm. The vector search hardware 820 is a hardware device that accelerates the vector and matrix operations, and may be called dedicated hardware or an offloading engine that is in charge of the vector calculation in the vector database system.

When a query is input to an arbitrary vector index structure, the vector index host 810 may create the candidate node list for the query vector, extract an arbitrary node from the candidate node list, and generate an approximate nearest neighbor search task that searches for neighbor nodes of the extracted node by referring to the link information. Thereafter, the vector index host 810 may transmit the request requesting the query search for the search target to the vector search hardware along with the information of the query vector or sequentially.

The vector search hardware 820 receives the request from the vector index host 810 to perform the search task, returns the search task to the vector index host 810, and maintains the idle state until the next request is received.

Thereafter, the vector index host 810 receives the response from the vector search hardware 820, updates the candidate node list, and then transmits the next search request to the vector search hardware 820. After receiving the search request from the vector index host 810, the vector search hardware 820 terminates the idle state and performs the search task again.

In the example of FIG. 8, the operation of the vector search hardware 820 is dependent on the vector index host 810, and causes the idle time in the performance of the search task.

Figure 9:
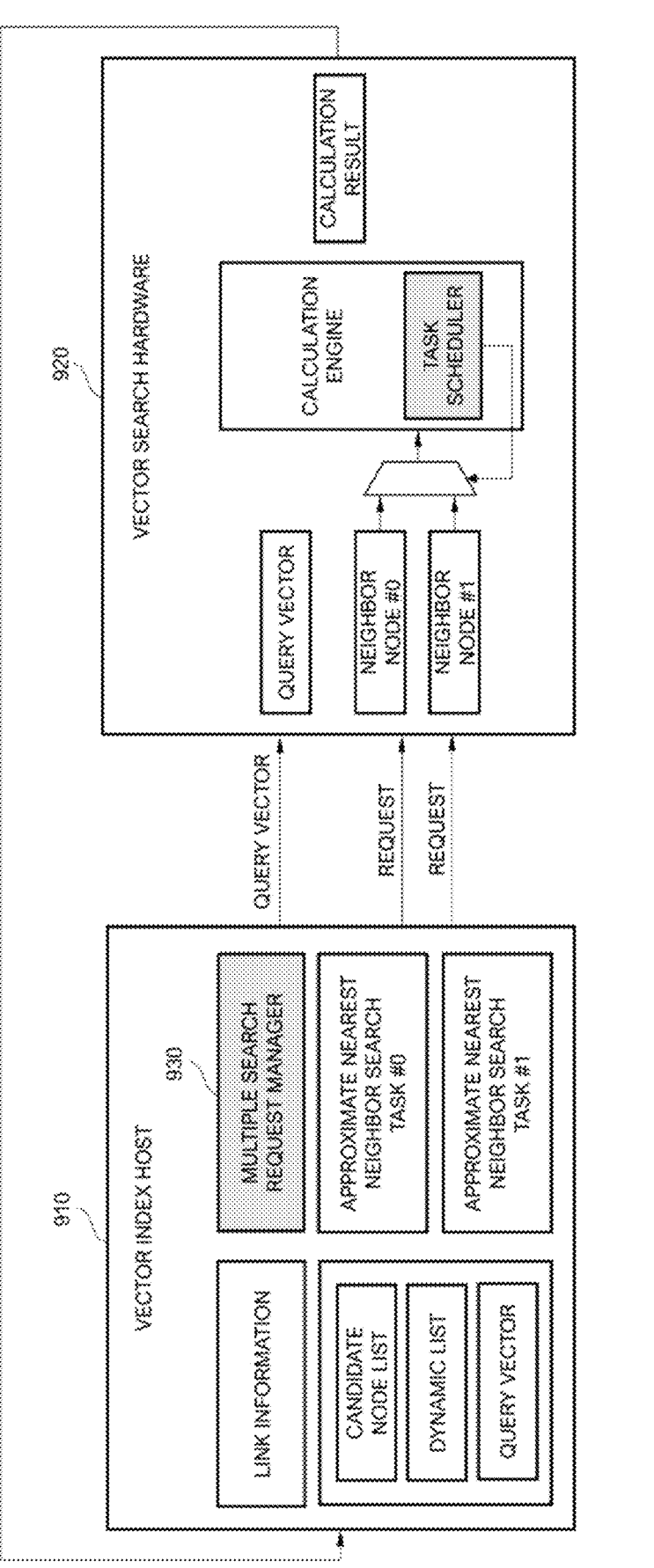
FIG. 9 is a diagram for describing the structure of the vector database system for processing multiple vector search requests according to an embodiment of the present disclosure.

FIG. 9 is a diagram for describing the structure of the vector database system for processing multiple vector search requests according to an embodiment of the present disclosure.

In the example of FIG. 9, when a query is input to any vector index structure, the vector index host 910 may create the candidate node list for the query vector.

In particular, the vector index host 910 according to an embodiment of the present disclosure includes a multiple search request manager 930 module. The multiple search request manager 930 may confirm the outstanding count of the vector search hardware 920 to identify the number of requests that may be additionally processed by the vector search hardware 920 at that time.

Furthermore, the vector index host 910 may generate a search task to be requested from the vector search hardware 920.

For example, the vector index host 910 may select the neighbor nodes of the first node of the candidate node list of the corresponding query as search targets for the corresponding query and generate approximate nearest neighbor search task #0. Furthermore, the vector index host 910 may select the neighbor nodes of the second node of the candidate node list of the corresponding query as the search targets for the corresponding query and generate approximate nearest neighbor search task #1. Thereafter, the vector index host 910 can transmit the search request to the vector search hardware sequentially or in parallel by referring to the number of requests that may be additionally processed by the vector search hardware 920 determined by the multiple search request manager 930.

The vector search hardware 920, which receives the search request, may schedule a plurality of vector search tasks through a task scheduler included in a calculation engine, and store the search results in the memory cache while performing the plurality of search tasks sequentially or in parallel.

In the above example, when the vector search hardware 920 receives a first request to perform a search for neighbor nodes of the first node for the query and a second request to perform a search for neighbor nodes of the second node for the corresponding query, the vector search hardware 920 may schedule the first search task according to the first request and the second search task according to the second request, and store each search result in the memory cache while performing the first search task and the second search task sequentially or in parallel.

When each search task is completed, the vector search hardware 920 may transmit the search results for the plurality of search tasks to the vector index host sequentially or in parallel, and the vector index host may update the candidate node list by referring to the search results.

Figure 10:
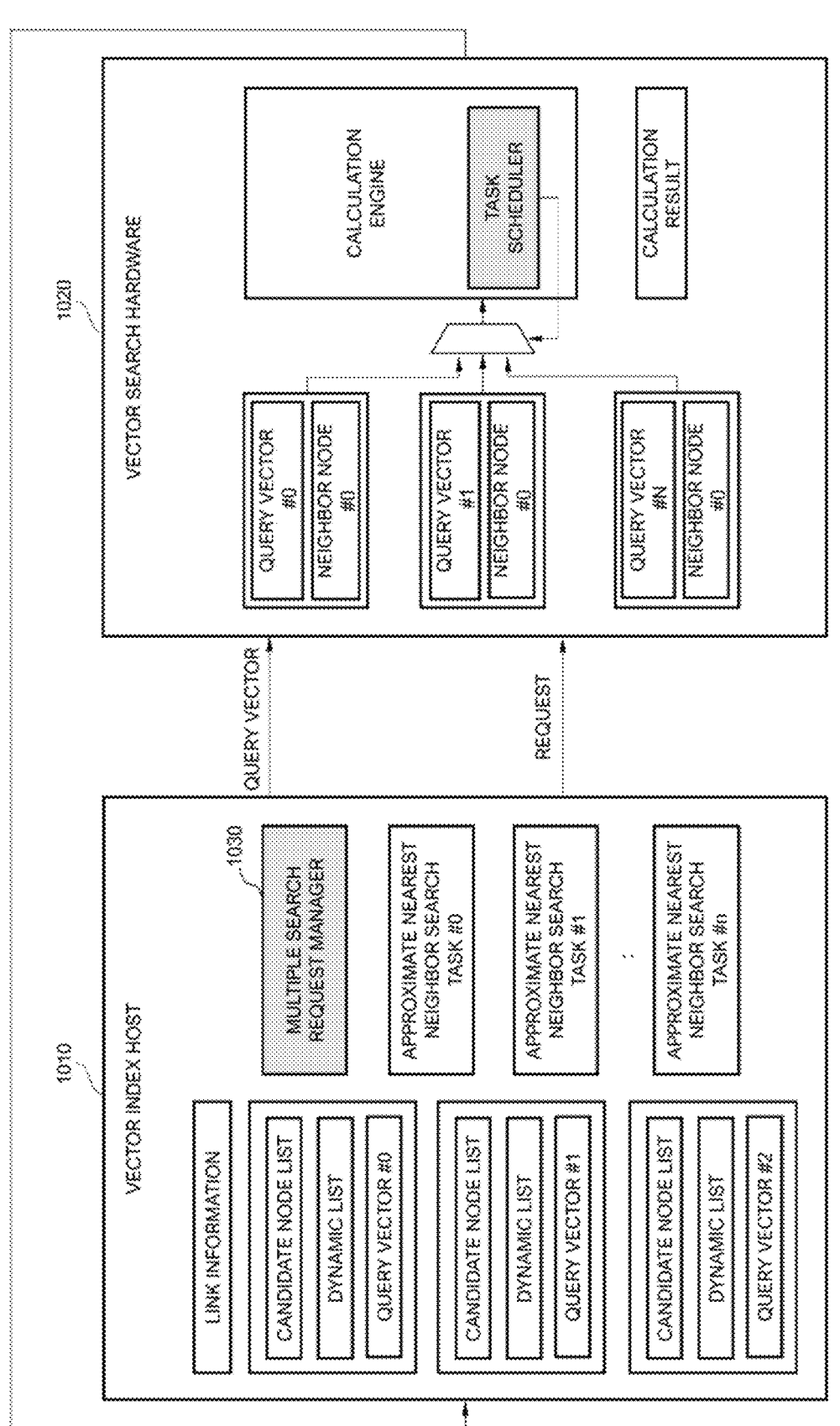
FIG. 10 is a diagram for describing a structure of a vector database system for processing vector search requests for multiple queries according to an embodiment of the present disclosure.

FIG. 10 is a diagram for describing a structure of a vector database system for processing vector search requests for multiple queries according to an embodiment of the present disclosure.

In the example of FIG. 10, when a query is input to any vector index structure, a vector index host 1010 may create the candidate node list for the query vector. When multiple queries are input, the vector index host 1010 may create the candidate node list for each of the multiple queries.

In particular, the vector index host 1010 according to an embodiment of the present disclosure includes a multiple search request manager 1030. The multiple search request manager 1030 may confirm the outstanding count of the vector search hardware 1020 to identify the number of requests that may be additionally processed by the vector search hardware 1020 at that time. Furthermore, the vector index host 1010 may generate a search task to be requested from the vector search hardware 1020.

For example, the vector index host 1010 may select neighbor nodes of an arbitrary node in the candidate node list of the first query as the search targets for the first query. Furthermore, the vector index host 1010 may select neighbor nodes of an arbitrary node in the candidate node list of the second query as the search targets for the second query. Thereafter, the vector index host 1010 can transmit the search request to the vector search hardware 1020 sequentially or in parallel by referring to the number of requests that may be additionally processed by the vector search hardware 1020 determined by the multiple search request manager 1030.

The vector search hardware 1020, which receives the search request, may schedule a plurality of vector search tasks through a task scheduler included in a calculation engine, and store the search results in the memory cache while performing the plurality of search tasks sequentially or in parallel.

In the above example, when the vector search hardware 1020 receives a first request to perform a search for neighbor nodes of an arbitrary node for the first query and a second request to perform a search for neighbor nodes of an arbitrary node for the second query, the vector search hardware 1020 may schedule the first search task according to the first request and the second search task according to the second request, and store each search result in the memory cache while performing the first search task and the second search task sequentially or in parallel.

When each search task is completed, the vector search hardware 1020 may transmit the search results for the plurality of search tasks to the vector index host 1010 sequentially or in parallel, and the vector index host 1010 may update the candidate node lists by referring to the search results.

In the examples of FIGS. 9 and 10, the vector index host 910 and 1010 does not wait for the response of the vector search hardware 920 and 1020, but transmits multiple search requests, so that the vector search hardware 920 and 1020 only needs to schedule the search task and the idle time does not occur. Therefore, the idle time of the vector search hardware 920 and 1020 and the dependency of the vector search hardware 920 and 1020 on the vector index host 910 and 1010 are removed, so that it is possible to increase the efficiency of the vector database system and the utilization of the hardware resources.

Figure 11:
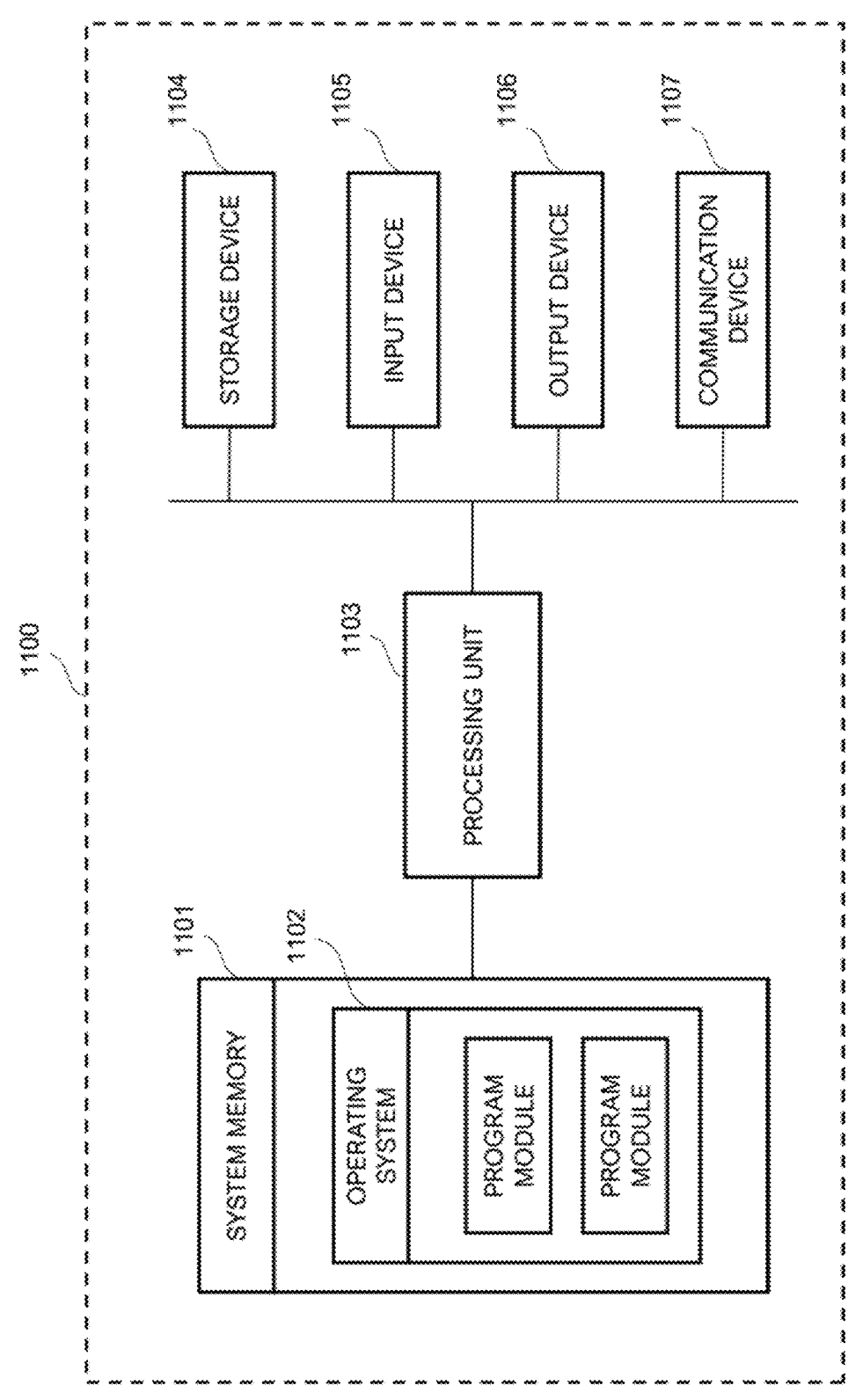
FIG. 11 is a diagram illustrating an exemplary computing operating environment of a system server according to an embodiment of the present disclosure.

FIG. 11 is a diagram illustrating an exemplary computing operating environment of a system server according to an embodiment of the present disclosure.

FIG. 11 is intended to provide a general and simplified description of a suitable computing environment in which embodiments of a system server 1100 may be implemented, and referring to FIG. 11, a computing device is illustrated as an example of the system server 1100.

The computing device may include at least a processing unit 1103 and a system memory 1101.

The computing device may also include a plurality of processing units that cooperate in executing a program. Depending on the exact configuration and type of the computing device, a system memory 1101 may be volatile (e.g., RAM), nonvolatile (e.g., ROM, flash memory, etc.), or a combination thereof. The system memory 1101 includes a suitable operating system 1102 for controlling the operation of the platform, such as the WINDOWS operating system from Microsoft Corporation. The system memory 1101 may also include one or more software applications, such as program modules, applications, etc.

The computing device may include additional data storage devices 1104, such as magnetic disks, optical discs, or tapes. Such additional storage may be removable storage and/or fixed storage. Computer-readable storage media may include volatile and nonvolatile, removable and fixed media implemented in any method or technique for storing information such as computer-readable instructions, data structures, program modules, or other data. The system memory 1101 and the storage 1104 are all examples of computer-readable storage media. The computer-readable storage media may include, but are not limited to, a RAM, a ROM, an EEPROM, a flash memory or other memory technology, a CD-ROM, a DVD or other optical storage, magnetic tape, magnetic disk storage or other magnetic storage devices, or any other medium capable of storing desired information and being accessed by the computing device 1100.

An input device 1105 of the computing device may include, for example, a keyboard, a mouse, a pen, a voice input device, a touch input device, and comparable input devices. The input device (1105) is widely known in the art, so a detailed description is omitted.

An output device 1106 of the computing device may include, for example, a display, a speaker, a printer, and other types of output devices. These output devices 1106 are well known in the art and therefore a detailed description thereof will be omitted.

The computing device may also include a communication device 1107 that allows the device to communicate with other devices via a network, such as a wired or wireless network, a satellite link, a cellular link, a local area network, and comparable mechanisms in a distributed computing environment. The communication device 1107 is one example of a communication medium, which may include computer-readable instructions, data structures, program modules, or other data therein. By way of example only, the communication medium may include, but is not limited to, wired media, such as a wired network or direct connection, and wireless media, such as acoustic, RF, infrared, and other wireless media.

Methods according to various embodiments of the present application may be implemented in the form of program commands that may be executed through various computer means and may be recorded in a computer-readable recording medium. The computer-readable recording medium may include program commands, data files, data structures or the like, alone or in combination. The program commands recorded in the computer-readable recording medium may be specially designed and configured for the embodiments or be known to those skilled in the field of computer software. Examples of the computer-readable recording medium may include a magnetic medium such as a hard disk, a floppy disk, or a magnetic tape; an optical medium such as a CD-ROM or a DVD; a magneto-optical medium such as a floptical disk; and a hardware device specially configured to store and execute program commands, such as a ROM, a RAM, a flash memory, or the like. Examples of the program commands may include machine language codes such as those made by compilers as well as high-level language codes capable of being executed by computers using interpreters or the like. The above-described hardware device may be constituted to be operated as one or more software modules to perform the operations of the embodiments, and vice versa.

According to embodiments of the present disclosure, it is possible to increase the efficiency of the vector database system by reducing the idle time of the hardware engine processing the vector search. In addition, according to embodiments of the present disclosure, it is possible to increase the utilization of the hardware resources of the vector database system by removing the dependency of the vector search hardware on the vector database host.

Technical effects of the present disclosure are not limited to the above-described technical effects, and technical effects that are not mentioned will be clearly understood by those skilled in the art to which the present disclosure pertains from the present specification and the accompanying drawings.

Embodiments have been described hereinabove by restrictive examples and drawings, but various modifications and variations may be made from the above description by those skilled in the art. For example, even when the described technologies are performed in an order different from that of the described method and/or components of the described system, structure, device, circuit, and the like, are coupled to or combined with each other in a form different from that of the described method, or are replaced by other components or their equivalents, appropriate results may be achieved.

Therefore, other implementations, other embodiments, and equivalents of the claims are within the scope of the following claims.

What is claimed is:

1. A method of processing multiple outstanding vector requests in a vector search system, the method comprising:

transmitting, by a vector index host apparatus for executing a vector index host, information on a plurality of vector queries to a vector search hardware apparatus for executing a vector search upon receiving the plurality of vector queries;

creating, by the vector index host apparatus, a candidate node list for each of the plurality of vector queries;

confirming, by the vector index host apparatus, a multiple-search counting number indicating a total number of search tasks being processed or waiting in the vector search hardware apparatus to identify a number of requests that can be additionally processed by the vector search hardware apparatus;

selecting by the vector index host apparatus, search target nodes from the candidate node list;

buffering, by the vector index host apparatus, a number of search requests including search requests for neighbor nodes of the search target nodes;

transmitting, by the vector index host apparatus, the search requests for the neighbor nodes of the search target nodes to the vector search hardware apparatus by referring to the multiple-search counting number without waiting for a search response to a previous search request from the vector search hardware apparatus to reduce an idle time of the vector search hardware apparatus; and transmitting, by the vector search hardware apparatus, search results for the search requests to the vector index host apparatus.

2. The method of claim 1, wherein the transmitting of the search requests includes transmitting, by the vector index host apparatus, a first search request for searching for similarity to an arbitrary query to neighbor nodes of a first node of a candidate node list for searching for the arbitrary query, and a second search request for searching for similarity to the arbitrary query to neighbor nodes of a second node of the candidate node list.

3. The method of claim 1, further comprising scheduling, by the vector search hardware apparatus, a search task according to each of the search requests.

4. The method of claim 1, wherein the transmitting of the search requests includes transmitting, by the vector index host apparatus, a third search request for searching for similarity to a first query to neighbor nodes of an arbitrary node of a candidate node list for searching for the first query, and a fourth search request for searching for similarity to a second query to neighbor nodes of an arbitrary node of a candidate node list for searching for the second query.

5. The method of claim 4, further comprising scheduling, by the vector search hardware apparatus, a search task according to the third search request or the fourth search request.

6. A vector search system for supporting multiple outstanding vector requests, the system comprising:

a vector index host apparatus for executing a vector index host, wherein the vector index host apparatus comprises a memory storing instructions and a processor coupled to the memory and configured to execute the instructions to:

transmit information on a plurality of vector queries to a vector search hardware apparatus for executing a vector search upon receiving the plurality of vector queries, create a candidate node list for each of the plurality of vector queries, confirm a multiple-search counting number indicating a total number of search tasks being processed or waiting in the vector search hardware apparatus to identify a number of search requests that can be additionally processed by the vector search hardware apparatus, select search target nodes from the candidate node list, buffer a number of search requests including search requests for neighbor nodes of the search target nodes, and transmit the search requests for the neighbor nodes of the search target nodes to the vector search hardware apparatus by referring to the multiple-search counting number without waiting for a search response to a previous search request from the vector search hardware apparatus to reduce an idle time of the vector search hardware apparatus; and the vector search hardware apparatus that transmits search results for the search requests to the vector index host apparatus.

7. An apparatus for executing a vector index host supporting multiple outstanding vector requests, the apparatus comprising:

a communication unit;

a memory storing instructions; and processor coupled to the memory and configured to execute the instructions to:

upon receiving a plurality of queries, transmit information on a plurality of vector queries to a vector search hardware apparatus for executing a vector search through the communication unit, create a candidate node list for each of the plurality of vector queries, confirm a multiple-search counting number indicating a total number of search tasks being processed or waiting in the vector search hardware apparatus to identify a number of requests that can be additionally processed by the vector search hardware apparatus, select search target nodes from the candidate node list, buffer a number of search requests including search requests for neighbor nodes of the search target nodes, transmit the search requests for the neighbor nodes of the search target nodes to the vector search hardware apparatus though the communication unit by referring to the multiple-search counting number without waiting for a search response to a previous search request from the vector search hardware apparatus to reduce an idle time of the vector search hardware apparatus, and receive search results for the search requests from the vector search hardware apparatus through the communication unit.

8. A computer-readable recording non-transitory medium in which a computer program executed by a computing device is recorded, the computer program comprising:

upon receiving a plurality of queries, transmitting information on a plurality of vector queries to a vector search hardware apparatus for executing a vector search;

creating a candidate node list for searching for each of the plurality of queries;

confirming a multiple-search counting number indicating a total number of search tasks being processed or waiting in the vector search hardware apparatus to identify a number of requests that can be additionally processed by the vector search hardware apparatus;

selecting search target nodes from the candidate node list;

buffering a number of search requests including search requests for neighbor nodes of the search target nodes;

transmitting the search requests for the neighbor nodes of the search target nodes to the vector search hardware apparatus by referring to the multiple-search counting number without waiting for a search response to a previous search request from the vector search hardware apparatus to reduce an idle time of the vector search hardware apparatus; and receiving search results for the search requests from the vector search hardware apparatus.

* * * * *